United States Patent
Eun et al.

[11] Patent Number: 5,454,343
[45] Date of Patent: Oct. 3, 1995

[54] METHOD FOR PRODUCTION OF DIAMOND PARTICLES

[75] Inventors: Kwang Y. Eun, Seoul; Jong K. Park, Kyunki-Do; Jae K. Lee, Seoul, all of Rep. of Korea

[73] Assignee: Korea Institute of Science and Technology, Rep. of Korea

[21] Appl. No.: 183,145

[22] Filed: Jan. 18, 1994

[51] Int. Cl.$^6$ .................................................. C30B 29/04
[52] U.S. Cl. ................... 117/1; 117/43; 423/446
[58] Field of Search .................. 117/1, 43, 47, 117/56, 71, 79, 89, 922, 929; 423/446

[56] References Cited

U.S. PATENT DOCUMENTS

| | | | |
|---|---|---|---|
| 4,034,066 | 7/1977 | Strong et al. | 423/446 |
| 4,042,673 | 8/1977 | Strong | 423/446 |
| 4,073,380 | 2/1978 | Strong et al. | 206/219 |
| 4,322,396 | 3/1982 | Strong | 423/446 |
| 5,264,071 | 11/1993 | Anthony et al. | 156/612 |
| 5,298,286 | 3/1994 | Yang et al. | 427/249 |

OTHER PUBLICATIONS

"Diamond–Graphite Equilibrium Line from Growth and Graphitization of Diamond"; Bundy, et al; *The Journal of Chemical Physics* vol. 35, No. 2, pp. 383–387 (Aug. 1961).
"Crystallization of Diamond and Graphite"; Strong, et al; *The Journal of Chemical Physics;* vol. 46, No. 9 (May 1, 1967); pp. 3668–3676.
"The Nickel–Nickel Carbide Eutectic and its Variation with Pressure; Strong"; *Transactions of the Mettalurgical Society of AIME;* vol. (233), (Apr. 1965); pp. 643–651.
"Some Studies of Diamond Growth Rates"; Wentorf, Jr., *The Journal of Chemical Physics;* vol. 75, No. 12, (1971); pp. 1833–1837.
"Further Studies of Diamond Growth Rates and Physical Properties of Lab–Made Diamond"; Strong et al; *The Journal of Physical Chemistry,* vol. 75, No. 12 (197); pp. 1838–1843.
"The Growth of Large Diamond Crystal"; Strong, et al; *Naturwissenschaften;* (1972); pp. 1–7.
"Effects of Gravity and Temperature Gradient on the Diamond Formation During Synthesis at 4.4 GPa and 1300° C."; Lee, et al; *J. of Cryst. Growth* 125 (1992) pp. 51–58.

Primary Examiner—R. Bruce Breneman
Assistant Examiner—Felisa Garrett
Attorney, Agent, or Firm—Ostrolenk, Faber, Gerb & Soffen

[57] ABSTRACT

A invention provides a method for production of diamond particles. The solvent metallic disk of a starting material specimen used in this diamond synthesis is divided into two layers. An intermediate layer is interposed between the two solvent metallic layers, so that the diamond crystals, formed on the two solvent metallic surfaces in contact with graphite disks and influenced by gravity, are not floated on the upper surface of the solvent metallic disk but grown at their positions in the individual solvent metallic layers at which they were nucleated. Hence, the method of this invention results in formation of the same number of diamond products, having the same size and desired good quality, on opposed surfaces or the upper and lower surfaces of the solvent metallic disk. The intermediate layer is a thin disk made of tungsten or molybdenum and having a thickness ranged from 10 μm to 100 μm.

3 Claims, 1 Drawing Sheet

METHOD FOR PRODUCTION OF DIAMOND PARTICLES

BACKGROUND OF THE INVENTION

1. Field of the Invention

The present invention relates in general to a method for production of diamond particle and, more particularly, to a method for production of diamond particles using a starting material specimen, comprising alternately stacked disks of graphite and solvent metal, at a high temperature and high pressure.

2. Description of the Prior Art

In a typical method for diamond synthesis, a starting material specimen is prepared by alternately stacking disks of graphite disks and solvent metallic disks. Here, each of the solvent metallic disks is made of a single metal or of at least binary alloy. The starting material specimen is, thereafter, charged in a high pressure generating device, and pressurized and heated in order to maintain the specimen at a high temperature not lower than a common melting temperature of the solvent metal and carbon, thus to achieve the formation of diamond nuclei particles at the interfaces between the graphite and liquid solvent metal which melted from the solvent metal disks. Such interfaces are formed, as can be seen in connection with the illustration of prior art in FIG. 1A discussed below, at the top and bottom of a solvent metal disk, which for convenience will be called a top interface and bottom interface, respectively.

At this time, the diamond crystals formed on opposed surfaces of the solvent metallic disks, that is, on each interface of the alternately laminated graphite disks and solvent metallic disks, are covered with thin films of liquid solvent metal, respectively, and continuously grow toward the graphite disks, thus to be increased in their sizes and to become the resulting large diamond particles. This diamond synthesis technique is disclosed in the following documents: H. P. Bovenkerk, F. P. Bundy, H. T. Hall, H. M. Strong, and R. H. Wentorf, Nature, 184(1959) 1094; J. Osugi, T. Arase, K. Hara and F. Amita, High Temp.—High Press., 16(1984) 191; and H. M. Strong and R. E. Hanneman, J. Chem. Phys., 46(1967) 3688.

With reference to FIGS. 1a and 1b, there is shown a typical starting material specimen for production of diamond particles in order to represent a typical method for diamond synthesis. FIG. 1a shows a sectional structure of the specimen in which the starting materials of diamond formation, that is, a plurality of graphite disks 1 and a plurality of solvent metallic disks 2, are alternately laminated. FIG. 1b shows the diamond particles 3 grown at the top and bottom interfaces of the solvent metallic disk 2. Here, the diamond crystals 3 are first submerged in the liquid solvent metallic disk 2.

The diamond crystal 3 has a lower density of about 3.52 g/cm$^3$, while the liquid solvent metal of the disk 2 has a higher density of about 8.5 g/cm$^3$ as disclosed in the document of H. M. Strong, Trans. Metall. Soc. AIME, 233(1965) 643, so that the diamond crystals 3 in the liquid solvent metallic disk 2 are floated toward the upper surface of the liquid disk 2 by the buoyancy resulting from the density difference of the light diamond crystals 3 and the heavy liquid solvent metal as shown in FIG. 1b. In the prior art, this floating of the light diamond crystals 3 to the upper surface of the liquid disk 2 due to the density difference of the diamond crystals and the liquid solvent metal has been regarded as an inevitable phenomenon generated in the mono-crystalline growth of diamond.

Conventionally, the thickness of solvent metallic disk used in diamond synthesis is so thin that it does not exceed 1 mm, and the synthesized diamond crystals have sizes ranged from several ten μm to several hundred μm. In this regard, as the diamond crystals 3 nucleated on a surface of the solvent metallic disk 2 are being grown, the buoyancy force, resulting from the density difference of the diamond crystals 3 and the heavy liquid solvent metal as described above, exerts an influence on the diamiond crystals to float upwards.

As a result of the above floating of light diamond crystals 3, which were synthesized near the bottom interface of the liquid solvent metallic disk 2, the number of diamond crystals on the top surface of the solvent disk 2 is larger than that of the bottom interface of the solvent disk 2. The interference between the diamond crystals growing on the top surface of the solvent disk 2, therefore, increases and, as a result, no good quality of diamond is made. On the other hand, very small number of diamond particles are formed on the bottom interface of the solvent disk 2 and, furthermore, the diamond partcles may be scarcely formed on the bottom interface of the solvent disk 2.

In addition, when the diamond crystals 3 are not completely floated toward the top surface of the solvent metallic disk 2 but suspended in the solvent disk 2, the solvent layers covering the diamond crystals 3 in the lower section of the solvent disk 2 becomes thicker than the solvent metallic layers covering the diamond crystals 3 on the upper section of the solvent disk 2. Hence, the growing speed of the diamond crystals in the lower section of the solvent disk 2 becomes slow, so that the sizes of the resulting diamond particles, which are formed on the opposed surfaces of the solvent disk 2, become different from each other, as a result of growth of the diamond crystals 3. In this regard it is impossible to effectively control the distribution density of the resulting diamond particles on the opposed surfaces of the solvent metallic disk 2 when the diamond crystals 3 are floated on the top surface of the liquid solvent 2 by the buoyancy resulting from the density difference between the light diamond crystals 3 and the heavy liquid solvent metal 2.

When the distribution density of the resulting diamond particles is controlled such that a desired number of diamond particles are formed on the top interface of the solvent metallic disk 2, very small number of diamond particles are formed on the bottom interface of the solvent disk 2 as shown in FIG. 1b. On the contrary, if a desired number of diamond particles are formed on the bottom interface of the solvent metallic disk 2, very large numbers of diamond particles are formed on the top interface of the solvent disk 2. As a result, the quality of diamond particles produced is adversely affected.

There have been proposed and established commercial varieties of methods for synthesis of diamond particles which overcome the above problems caused by the floating of the light diamond crystals toward the top interface of the liquid solvent due to the density difference between the diamond crystals and the liquid solvent metal. For example, it has been noted that it is preferred to render the diamond crystals being arranged in a low temperature region placed at a lower section (on the basis of gravity direction) of the starting material specimen in order to grow single crystal diamond particles. This technique is disclosed in the following documents: R. H. Wentorf, J. Phys. Chem., 75(1971)

1833; H. M. Strong and R. M. Cherenko, J. Phys. Chem., 75(1971); H. M. Strong and R. H. Wentorf, Die Naturwissen-Schften, 59(1972) 1; U.S. Pat. Nos. 4,034,066, 4,042,673, 4,073,380 and 4,322,396.

We have systematically and closely examined the effects of gravity on a starting material specimen of diamond synthesis, which specimen is not different from the above typical starting material specimen except for thickness of the solvent metallic disk [J. K. Lee, J. K. Park and K. Y. Eun, Effects of Gravity and Temperature Gradient of the Diamond Formation during Synthesis at 4.4 Gpa and 1300° C., submitted to J. Cryst. Growth]. In this regard, the floating of the diamond crystals toward the top interface of the liquid solvent by the buoyancy resulting from the density difference between the diamond crystals and the liquid solvent metal does not appear to be a novel phenomenon.

SUMMARY OF THE INVENTION

It is, therefore, an object of the present invention to provide a method for synthesis diamond particles in which the above problems caused by the floating in diamond crystals during diamond synthesis are solved by dividing a solvent metallic disk of a starting material specimen of the diamond synthesis into two layers by inserting an intermediate (floatation suppressing) layer within the solvent metal disk. As a result, the diamond crystals, formed on both interfaces of each solvent metal disk are not floated to the top interface of the solvent metal disk but grown at their positions at which they were nucleated. The method of the present invention results in the synthesis of about the same number of diamond particles, having about equal size and high quality, at both interfaces of each solvent metal disk.

The present invention provides a method for synthesis of diamond particles using a starting material specimen, the specimen comprising alternately stacked graphite disks and solvent metallic disks, at a high temperature and a high pressure, wherein an intermediate layer is into the solvent metallic disks, thus to prevent diamond crystals from floating toward an top interface of the solvent disks and to cause about the same number of diamond particles with regular size to be formed on top and bottom interfaces of the solvent layer.

In the present invention, the intermediate layer interposed in the solvent metallic disk for prevention of floating of the diamond crystals is preferably made of a material, having a lower solubility and a higher melting temperature as compared to the solvent metal, such as tungsten or molybdenum.

It is preferred to make the thickness of the intermediate layer in the ranged from 10 μm to 100 μm.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b are sectional views of a typical starting material specimen for diamond synthesis, showing a typical method for synthesis of diamond particles, respectively, in which:

FIG. 1a shows a sectional structure of the specimen, comprising alternately stacked graphite disks 1 and solvent metallic disks 2, before diamond synthesis; and FIG. 1b shows a plurality of diamond crystals growing on top and bottom interfaces of the solvent metallic disk and shows difference in distribution density and size of diamond particles between top and bottom interfaces of a solvent metal disk;

FIGS. 2a and 2b are sectional views of a starting material specimen for diamond synthesis, showing an improved method for synthesis of diamond particles in accordance with the present invention, respectively, in which:

FIG. 2a shows a sectional structure of the specimen, comprising alternately stacked graphite disks and solvent metallic disks and an intermediate layer 4 inserted into each of the solvent metallic disk, before diamond synthesis; and FIG. 2B shows a plurality of diamond crystals formed on opposed surfaces of the solvent metallic disk and shows even distribution density of the diamod particles on top and bottom interfaces of the solvent metal disk.

DESCRIPTION OF THE PREFERRED EMBODIMENTS

Figure 1A:
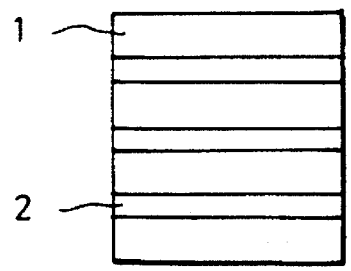
Figure 1B:
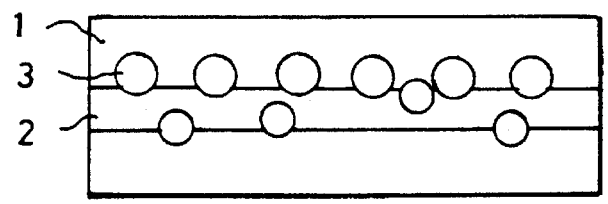
Figure 2A:
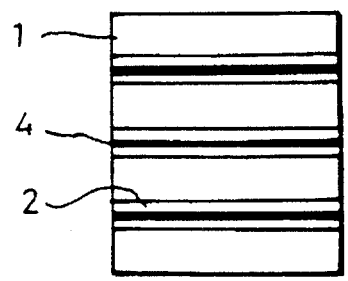
Figure 2B:
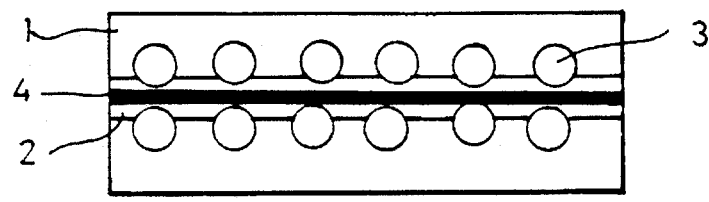

FIG. 2a shows a sectional structure of a starting material specimen, comprising alternately stacked graphite disks and solvent metallic disks and an intermediate layer inserted into each of the solvent metallic disk, before diamond synthesis. FIG. 2b shows a plurality of diamond crystals growing on opposed interfaces of the solvent metallic disk and shows even distribution density of the seed crystals on top and bottom interfaces of the solvent disk.

As shown in FIG. 2a, the starting material specimen used in the diamond synthesis method of the present invention comprises alternately stacked graphite disks 1 and solvent metallic disks 2 having an intermediate after intermediate layer 4 interposed in each of the solvent metallic disk 2. Thus the intermediate layer 4 divides the solvent disk 2 into two layers, that is, an upper layer and a lower layer. The interposition of the intermediate layer 4 in each of the solvent disk 2 is for prevention of floating of diamond crystals 3, formed on the lower layer of each of the solvent disk 2, due to the density difference of the diamond crystals 3 and the liquid solvent metal. In the present invention, the intermediate layer 4 is preferably made of a material, having a lower solubility and higher melting temperature with respect to the solvent metal 2, such as tungsten (W) or molybdenum (Mo). In addition, it is preferred to make the thickness of the intermediate layer be ranged from 10 μm to 100 μm.

As shown in FIG. 2b, in accordance with the diamond synthesis method using the starting material specimen having the intermediate layer 4, the diamond crystals 3 formend on the lower layer of the solvent disk 2 is prevented from floating toward the upper surface of the solvent disk 2 by the intermediate layer 4. Hence, about the same number of diamond particles with regular size are formed on top and bottom interfaces of each solvent disk 2, respectively.

In the method of the present invention, the distribution density of diamond crystals 3 on the upper and lower surfaces of the solvent metallic disk 2 is effectively controlled, so that desired good quality of diamond particles are synthesized on the upper and lower surfaces of each solvent disk.

The following examples are merely intended to illustrate the present invention further in detail and should by no means be considered to be limitative of the invention.

EXAMPLE 1

Diamond particles were synthesized, using solvent metal disks having a composition of 70 Ni—30 Fe and changing the thickness of the solvent metallic disk and changing the material and thickness of the intermediate layer as represented in Table 1, under a diamond synthesis condition of 44 kbar and 1300° C.

TABLE 1

| solvent | thickness* | material & thickness** |
|---|---|---|
| 70Ni—30Fe | 150 μm | tungsten, 10 μM |
| 70Ni—30Fe | 100 μm | tungsten, 10 μm |
| 70Ni—30Fe | 150 μm | molybdenum, 10 μm |
| 70Ni—30Fe | 100 μm | molybdenum, 10 μm |
| 70Ni—30Fe | 150 μm | tungsten, 30 μm |
| 70Ni—30Fe | 100 μm | tungsten, 30 μm |
| 70Ni—30Fe | 150 μm | molybdenum, 30 μm |
| 70Ni—30Fe | 100 μm | molybdenum, 30 μm |
| 70Ni—30Fe | 150 μm | tungsten, 100 μm |

*thickness of solvent metal disk
**material and thickness of intermediate layer

Under the diamond synthesis conditions of Table 1, nearly the same number of diamond particles of nearly the same size were formed on the top and bottom interfaces of the solvent metallic disk.

The sizes of the diamond crystals were increased in accordance with lapse of diamond synthesis time. In addition, there was no prominent difference in diamond synthesis irrespective of the changing the thickness of the intermediate layer between 10 μm, 30 μm and 100 μm. Furthermore, the diamond synthesis of this invention was not influenced by change of the material of the intermediate layer between the tungsten and the molybdenum.

The thickness of the solvent metallic disk had no prominent effect on the diamond synthesis. However, in the case of diamond synthesis in a short time, the effect of the intermediate layer of thickness of 100 μm was more prominent than that of 150 μm thickness.

EXAMPLE 2

The procedure of Example 1 was repeated, substituting nickel, 46 kbar and 1450° C. for 70 Ni—30 Fe, 44 kbar and 1300° C., respectively. As a result, nearly the same number of diamond products of nearly the same size were formed on the top and bottom interfaces of the solvent metallic disk.

EXAMPLE 3

The procedure of Example 1 was repeated, substituting 60 Fe—30 Ni—10 Co for 70 Ni—30 Fe. As a result, nearly the same number of diamond products of nearly the same size were formed on the top and bottom interfaces of the solvent metallic disk.

It is apparent from the above Examples that the diamond synthesis method using the starting material specimen having the intermediate layer made of tungsten or molybdenum in accordance with the present invention prevents floating of the diamond crystals to the top interface of a solvent metallic disk during the diamond synthesis and results in formation of the same number of diamond particles of the same size on the top and bottom interfaces of the solvent material disk.

What is claimed is:

1. In a method for production of diamond particles using a starting material specimen at elevated temperatures and pressures, the specimen comprising alternately stacked graphite disks and solvent metal disks so that top and bottom interfaces on said solvent metal disks are formed with neighboring graphite disks, the improvement which comprises the provision of a floatation suppressing layer within each of said solvent metal disks to prevent diamond particles floating from a bottom interface toward a top interface of said solvent disks thus resulting in the synthesis of about the same number of diamond particles on the top interface as that on the bottom interface of each of said solvent metal disks.

2. The method according to claim 1, wherein said floatation suppressing layer is a disk made of tungsten or molybdenum.

3. The method according to claim 1, wherein the thickness of said floatation suppressing layer is from about 10 μm to about 100 μm.

* * * * *